July 30, 1968   F. R. McALARNEY   3,394,752
PLASTIC CURTAIN
Filed March 3, 1966   2 Sheets-Sheet 1

INVENTOR.
FRED McALARNEY
BY
ATTORNEYS.

July 30, 1968  F. R. McALARNEY  3,394,752
PLASTIC CURTAIN

Filed March 3, 1966  2 Sheets-Sheet 2

INVENTOR.
FRED McALARNEY
BY
ATTORNEYS.

3,394,752
PLASTIC CURTAIN
Fred R. McAlarney, Seymour, Ind., assignor to The H. O. Canfield Co., Inc., Seymour, Ind., a corporation of Indiana
Filed Mar. 3, 1966, Ser. No. 531,456
7 Claims. (Cl. 160—206)

ABSTRACT OF THE DISCLOSURE

A closure member formed of interconnected narrow plastic strips connected together at their edges in tongue-and-groove relation. The edges are formed of relatively rigid plastic material and are connected by a flexible web portion. The interconnected strips are mounted in tracks, so that the relatively rigid edges of the respective strips act as transverse support members for the screen. The closure member is also provided with rigid plastic terminal members connected to the interconnected plastic strips in tongue-and-groove relationship.

*Brief description of the invention*

Briefly, the invention comprises a plurality of plastic extrusions formed by simultaneously extruding through a single die parallel, integral strips of rigid and flexible plastic material. The extruded strip is formed with opposed edges of relatively rigid plastic material having an interconnected web of relatively flexible plastic material which is extruded in the form of a pair of oppositely facing U-shaped folds. As the strip is viewed in cross section, one of the opposed edges is formed in the shape of an enlarged tongue, while the opposite edge is formed with a C-shaped groove. A closure member may be formed of any desired length by cutting the extruded strips to a length corresponding to the width of the screen and sliding the strips together in tongue-and-groove relationship. The relatively rigid edges act as transverse support for the closure member. Preferably, the flexible web is trimmed a short distance from the ends of the rigid edges to insure unobstructed movement of the ends of the rigid edges in suitable tracks. The terminal edges of the closure member may be relatively rigid plastic members which engage the adjacent strips in tongue-and-groove relationship.

It is an object of this invention to provide an improved folding screen which is simple and economical in construction and is not limited in size by the die head.

Another object of this invention is to provide a unitary extrusion which can be cut to any desired length and can be assembled without the use of tools.

Briefly in accordance with aspects of this invention, a pair of extruders are connected to a single die head and one of the extruders delivers a relatively rigid plastic material in molten form to the die head and the other extruder delivers relatively flexible material in molten form to the die head. Advantageously, the die head includes passages such that the relatively rigid material is split into two streams communicating with opposite edges of a die opening and the relatively flexible material is connected by a suitable passage to the central portion of the die opening. The single extrusion is extruded through a die opening such that a portion having a circular cross section defines one end of the opening and produces a longitudinal tongue and a portion having a substantially C-shaped cross section for producing a longitudinal groove defines the other end of the opening. The opening intermediate these ends is serpentined such that the extrusion is provided with folds intermediate the tongue and groove edges. The circular cross-sectioned edge of the opening produces a tongue-shaped edge portion for matingly engaging a longitudinally grooved portion of the next adjacent strip. After the extrusion is cooled, it is cut into lengths closely approximating the heighth of the opening to be closed by the screen. The folding or flexible portions of the screen are then trimmed a short distance back from the edges of the rigid edge portions. The lengths of the plastic stripping are now slid together by interlocking tongues and grooves. The opening is preferably provided with tracks on the top and bottom. The plastic assembly is now held in a vertical plane and the rigid projecting end portions are slid in the tracks. Advantageously, the opposite edges of the screen may be provided with terminal portions one of which has a tongue-shaped projection and the other of which has a groove-shaped projection to matingly engage the opposite edges of the assembled screen.

These and various other objects and features of the invention will be more clearly understood from a reading of the detailed description of the invention in conjunction with the drawing in which.

Figure 1:
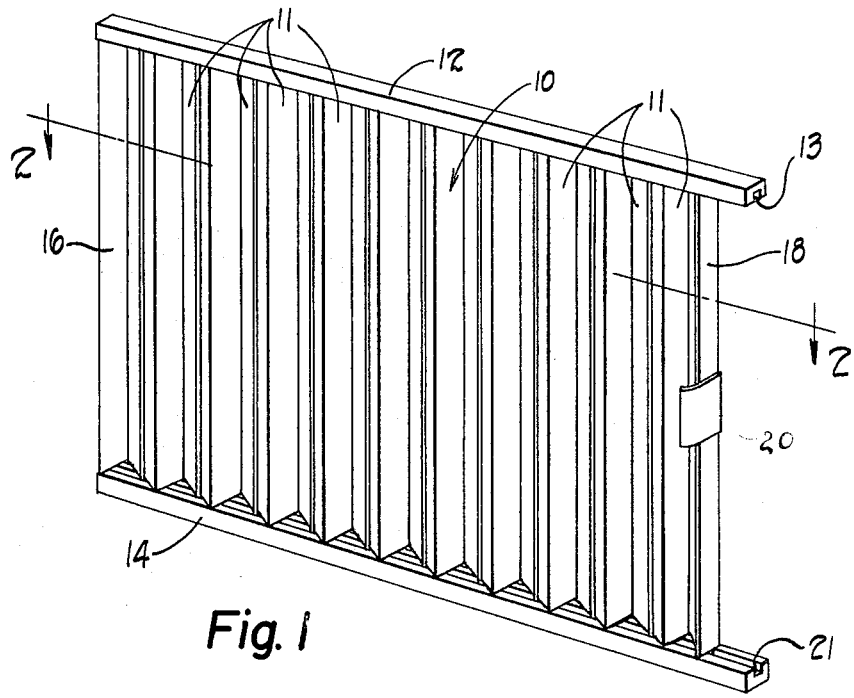
FIG. 1 is a view in perspective of one illustrative embodiment of folding screen assembly according to this invention.

Referring now to the drawing, one embodiment of plastic screen employing this invention is shown in perspective in FIG. 1 which shows a flexible plastic screen 10 including a plurality of identical strips 11 of plastic material each slidably mounted in parallel upper and lower tracks 12 and 14, respectively. Each strip 11 includes a relatively flexible web portion connecting relatively rigid edge portions of tongue and groove construction which will be subsequently described in greater detail. As employed in this application, the term "relatively rigid" shall be construed to mean plastic material measured on the D scale of the Shore Durometer and having a reading in the range of 76–80. The term "relatively flexible" shall be construed to mean material which exhibits on the Shore A scale a hardness in the range of 50–90 and preferably approximately 70. One end of the screen 10 is preferably secured to a suitable wall 16. The wall 16 may, in fact, be a window sash and the upper track 12 may be mounted on the lower portion of a window. Alternatively, track 12 may be mounted to extend between opposite facing surfaces of the window sash. The lower track 14 in this particular environment is mounted on the window sill. It is, of course, understood that the embodiment may be of considerably larger size such as a folding room partition in which the track 12 could be mounted in the ceiling and the track 14 could be recessed in the floor. The surface 16 would then constitute a wall of the room or an edge of a projection. The track 12 is formed of a member having a generally U-shaped cross section with a longitudinal recess 13 which receives the projecting relatively rigid plastic portions of the screen to act as a guide for the screen or partition 10.

A terminal plastic member 17 is secured to the surface 16 by suitable means such as by screws and has an edge which matingly engages the adjacent edge of a strip 11. Similarly, a terminal member 18 matingly engages the edge of the adjacent strip 11 on the opposite end of the screen and member 18 is provided with a suitable handle 20. Handle 20 may be formed of plastic material and may contain magnetic material such that it would adhere to a metal member affixed to the wall, not shown. If the screen 10 is to fill the space between a window sash and an air conditioner, handle 20 may be omitted and member 18 may contain magnetic particles to make the member 18 adhere to the air conditioner. The lower track 14 has a generally U-shaped cross-section corresponding to that of the upper track 12 and has a longitudinal recess 21 which receives rigid portions of the screen to guide the screen.

Figure 2:
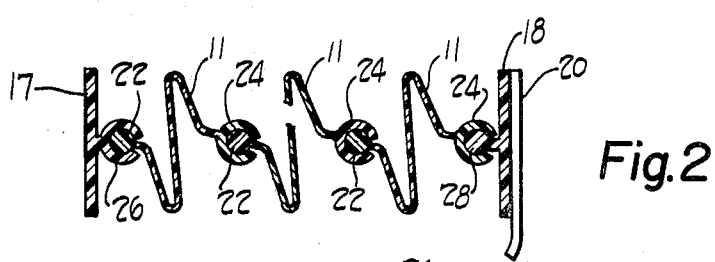
FIG. 2 is a fragmentary view in section taken along the lines 2—2 of FIG. 1.

The mating tongue and groove connection of plastic strips is shown in detail in FIG. 2 which is a foreshortened sectional view of the screen of FIG. 1, to an enlarged scale.

Each strip 11 includes a longitudinal edge defining tongue portion 22 having a relatively circular cross section and formed of relatively rigid material and a longitudinal edge defining groove portion 24 defining the opposite edge of the strip 11 from portion 22. Groove portion 24 is also formed of relatively rigid material and is preferably substantially C-shaped in cross section. The tongue and groove edges 22, 24 are connected together by relatively flexible web portion 25 which is preferably formed with a pair of folds to facilitate the folding of the curtain into a relatively compact space when its use is not required. Preferably the folds are substantially U-shaped in cross-section and are equally spaced from the tongue and groove edges 22, 24, respectively, to divide the web portion 25 in a manner such that the intermediate straight section is approximately twice as long as the outer straight sections. Thus, each fold is substantially one-half of the transverse dimension of the flexible web portion. It is of course, understood that additional folds may be provided but an even number is preferred so that half of the flexible web will lie on either side of the track center line and the screen will be balanced.

The terminal strip 17 is preferably formed of relatively rigid material and includes an integral, longitudinally extending groove portion 26 which is substantially C-shaped in cross-section to receive the tongue portion 22 of the next adjacent strip 11 and held in spaced relationship to the main body of strip 17 by a narrow web 27. Similarly, the screen is provided at the opposite end with a terminal strip 18 which has an integral longitudinally extending tongue-like portion 28 which is substantially circular in cross section to matingly engage the C-shaped portion 24 of the adjacent strip 11 and which is held in spaced relationship to the main body of strip 18 by a narrow web 29.

Figure 3:
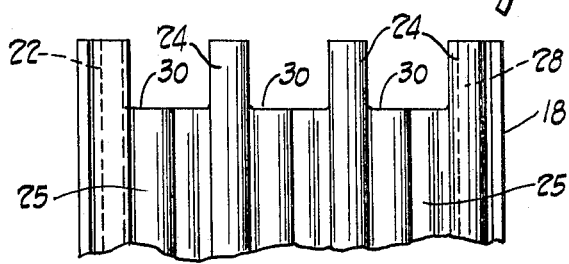
FIG. 3 is a view, to an enlarged scale and partly broken away, of edge portions of the screen assembly of FIG. 1.

The details of the top and bottom of the screen 10 are shown in FIG. 3 which is a fragmentary view substantially foreshortened of the view of FIG. 2 and showing the upper and lower edges of the screen in elevation. The flexible webs 25 are cut along the edges of the tongue and groove portions to define substantially U-shaped notches 30 at the top and substantially U-shaped notches 31 at the bottom of the screen so that the web portion 25 clears the tracks 12, 14. The projecting portions of the relatively rigid tongue and groove portions 22, 24 may now be placed in suitable tracks such as the tracks 13, 14 of FIG. 1, so that the relatively rigid portions act as slides and supports for the relatively flexible web portions 25 of the screen.

Figure 4:
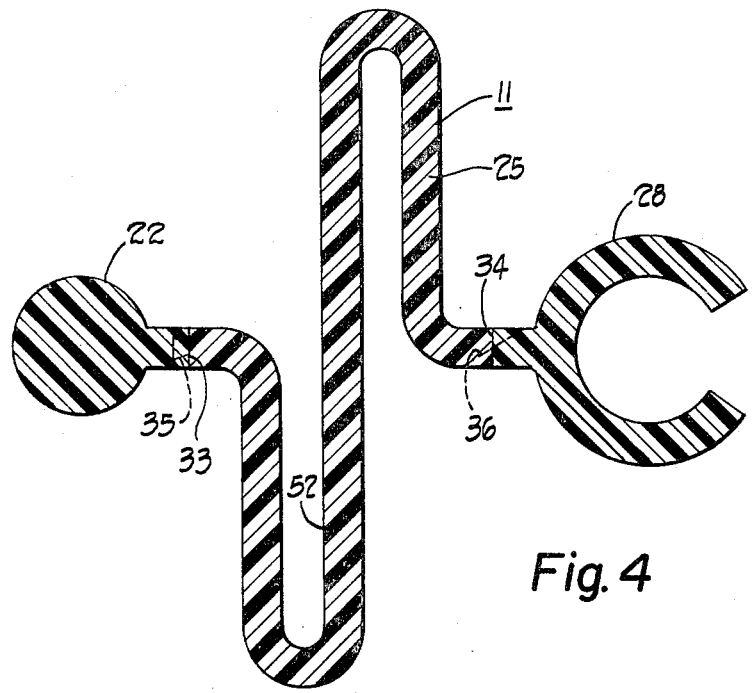
FIG. 4 is a view in elevation to a greatly enlarged scale of an edge of a plastic extrusion employed to produce the screen of this invention.
Figure 5:
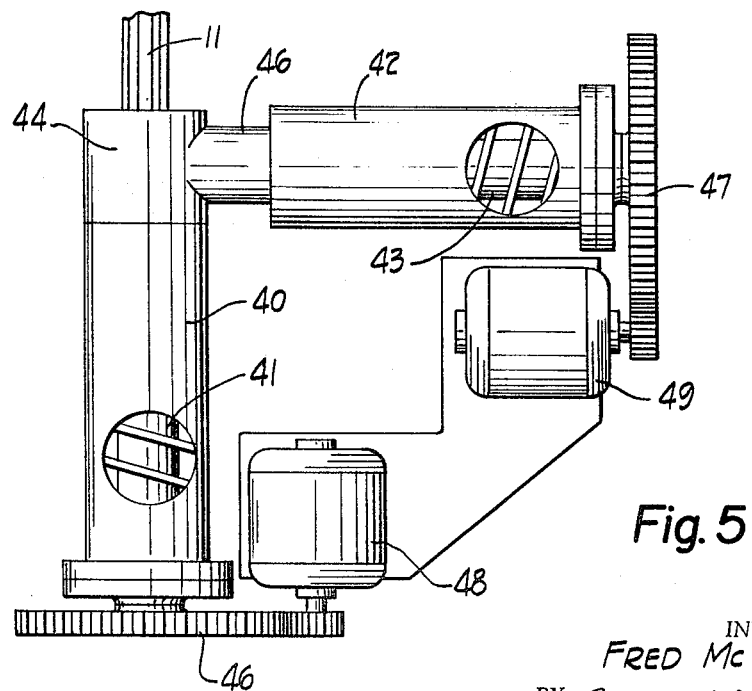
FIG. 5 is a plan view of portions of apparatus for extruding screens according to this invention.

The method of making the individual plastic strips will be described indetail in conjunction with FIGS. 4 and 5 in which FIG. 4 is an enlarged sectional view of one of the strips 11 as it is extruded from a die head and FIG. 5 is an extruding arrangement in which the strip 11 is being extruded from a pair of extruders connected to a single die head. FIG. 4 shows, to a greatly enlarged scale, a transverse sectional view of a single strip 11 of plastic material. The relatively rigid tongue-like edge 22 is joined to the relatively flexible web 25 along a substantially vertical line 33 and flexible web 25 is joined to a radially extending web of the substantially C-shaped groove portion 28 along a second substantially vertical line 34. Adjacent the junction line 33, is a dotted line outline of a dove-tail connection 35. The streams of plastic material could be provided with this cross section to produce the bond between the two strips of plastic material by cutting the die to conform to this cross section. This dove-tail would, of course, produce a better bond over a substantially larger area than would the vertical line bond 33. However, for relatively small screens, perpendicular or abutting bonding is adequate. Alternatively, a diagonal bond could be employed to the type shown in dotted outline at 36 which bisects the vertical line 34. This diagonal bond would, of course, result in a greater bonding area and thus a stronger bond at the junction of the two materials.

The flexible web 25 is formed of a soft vinyl having a flexibility in the range of 50–90, and preferably approximately 70, as measured on the Shore "A" Durometer scale. The relatively rigid tongue and groove portions 22, 28, respectively, are formed of vinyl having a hardness, as measured on the Shore Durometer "D" scale, in the range of 76–80. In FIG. 5, a first extruder 40 having a screw 41 and a second extruder 42 having a screw 43 are connected in perpendicular relationship to a common die head 44. The extruder 40 extrudes in a substantially straight line through the die head 44, a molten stream of plastic which, when cooled, becomes the relatively rigid material. Die head 44 has an opening, not shown, closely corresponding to the shape of the sectional view of the strip 11 of FIG. 4. The second extruder 42 delivers through a conduit 46 into the die head 44 a molten stream of vinyl material which, when cooled, becomes the relatively flexible web 25. A suitable channel is provided in die head 44 to bring this stream intermediate a pair of parallel streams forming the tongue edge 22 and the groove edge 28. The screws 41, 43 are driven through suitable gear trains 46, 47 from a pair of individual electric motors 48, 49, respectively. It is, of course, understood that other forms of drives for the screws 41, 43, may be employed. It is not essential that the molten, relatively rigid material be extruded straight through the die head 44. This arrangement is preferred principally because a greater volume of this material is being extruded than the volume of the relatively flexible material which becomes the flexible web 25. The extruder 40 for the relatively rigid material is internally heated by suitable electrical elements, not shown, to a temperature of the order of 350° to 400° F., whereas the extruder 42 is internally heated by suitable electric heaters, also not shown, to a temperature in the range of 320° to 350° F.

It is known in the art to extrude simultaneously strips of plastic of different hardness through a single opening in a die with the opening providing mating surfaces such that the two strips are joined together. One example of such simultaneous extrusion is shown in Steinle U.S. Patent No. 1,356,891.

Preferably the strip 11 is formed with one or more folds and in the preferred embodiment is provided with a pair of oppositely facing U-shaped folds or turns 50, 52 such that the straight portion intermediate the two U-shaped folds is substantially one-half the entire width of the flexible web 25. The folds are provided with 180° circular curves so that the relatively flexible web will not contact itself and cohere before a suitable coolant has had an opportunity to cool to its solid state. It is, of course, understood that the extruder head 44 extrudes strip 11 into a liquid bath of suitable coolant such as water.

The two vinyl materials may be of different color or the flexible web 25 may be of relatively clear material. Further, the thickness of the strips may be modified as required by mechanical specifications. In one embodiment, a web thickness of .030 inch was employed with a tongue 22 having a diameter of 0.10 inch. The C-shaped edge had an internal diameter of 0.110 inch and an external diameter of 0.170 inch. The width of the opening in member 28 was approximately 0.060 inch. The tongues slide freely into the grooves to permit manual assembly of any length screen without tools.

While one embodiment of screen and one embodiment of the method of making same has been described in detail, it is understood that the concepts thereof could be employed in other embodiments without departing from the spirit and scope of this invention.

What is claimed is:

1. A closure member comprising a plurality of interconnected extruded plastic strips each having a relatively rigid tongue portion extending longitudinally of one edge thereof and a relatively rigid groove portion extending longitudinally of the other edge thereof, and a relatively flexible web portion integrally formed and connecting said tongue and groove portions, each tongue portion matingly engaging a groove portion of the next adjacent strip, said tongue and groove portions being positioned to extend vertically at least to the terminal edges of said web portions, thus defining transverse supports for said closure member.

2. A closure member according to claim 1 wherein each of said web portions is pleated.

3. A closure member according to claim 1 wherein said web portion is provided with at least two equal sized folds which are generally U-shaped in cross section with the arms of said U-shaped portions extending in opposite directions whereby said pleated portions extend equal distances on opposite sides of the plane containing said rigid portions.

4. A closure member comprising a plurality of interconnected plastic strips each having a relatively rigid tongue portion extending longitudinally of one edge thereof and a relatively rigid groove portion extending longitudinally of the other edge thereof; and a relatively flexible web portion connecting said tongue and groove portions, each tongue portion matingly engaging a groove portion of the next adjacent strip, said tongue and groove portions defining transverse supports, and a pair of parallel, opposed members, each having a longitudinal recess therein, each end of each relatively rigid portion engaging one of said recesses in sliding relationship.

5. The closure member according to claim 4 wherein each relatively rigid portion extends beyond said web portion on each end of each plastic strip.

6. A closure member according to claim 4 further including a relatively rigid, flat plastic strip having a portion C-shaped in cross section extending longitudinally thereof and extending substantially perpendicularly therefrom for defining one end of said closure member.

7. A closure member according to claim 4 further including a relatively rigid, flat plastic strip having a portion extending longitudinally thereof and projecting perpendicularly therefrom with a substantially circular cross section for matingly engaging a grooved edge of one of said strips.

References Cited
UNITED STATES PATENTS

| | | | |
|---|---|---|---|
| 2,351,656 | 6/1944 | Auten | 160—199 |
| 2,894,573 | 7/1959 | Rosenfeld | 160—84 |
| 2,897,515 | 8/1959 | Collins | 160—84 X |
| 3,101,485 | 8/1963 | Kirshenbaun | 160—235 X |
| 3,177,926 | 4/1965 | Brancato et al. | 160—201 X |
| 3,277,952 | 10/1966 | Tsuhako | 160—183 X |

DAVID J. WILLIAMOWSKY, *Primary Examiner.*

DENNIS L. TAYLOR, *Assistant Examiner.*